United States Patent
Porterfield, Jr. et al.

(10) Patent No.: US 12,034,196 B2
(45) Date of Patent: Jul. 9, 2024

(54) HYBRID CIRCULATOR

(71) Applicant: MICRO HARMONICS CORPORATION, Fincastle, VA (US)

(72) Inventors: David W. Porterfield, Jr., Daleville, VA (US); Jeffrey L. Hesler, Charlottesville, VA (US)

(73) Assignee: MICRO HARMONICS CORPORATION, Fincastle, VA (US)

( * ) Notice: Subject to any disclaimer, the term of this patent is extended or adjusted under 35 U.S.C. 154(b) by 347 days.

(21) Appl. No.: 17/631,664

(22) PCT Filed: Dec. 11, 2020

(86) PCT No.: PCT/US2020/064485
§ 371 (c)(1),
(2) Date: Jan. 31, 2022

(87) PCT Pub. No.: WO2021/188171
PCT Pub. Date: Sep. 23, 2021

(65) Prior Publication Data
US 2022/0278433 A1     Sep. 1, 2022

Related U.S. Application Data

(60) Provisional application No. 62/992,376, filed on Mar. 20, 2020.

(51) Int. Cl.
| | |
|---|---|
| *H01P 1/393* | (2006.01) |
| *H01P 1/161* | (2006.01) |
| *H01P 1/175* | (2006.01) |
| *H01P 11/00* | (2006.01) |

(52) U.S. Cl.
CPC .............. *H01P 1/393* (2013.01); *H01P 1/161* (2013.01); *H01P 1/175* (2013.01); *H01P 11/002* (2013.01)

(58) Field of Classification Search
CPC .. H01P 1/175; H01P 1/174; H01P 1/17; H01P 1/165; H01P 1/161; H01P 1/36; H01P 1/38; H01P 1/393; H01P 1/39; H01P 1/32
See application file for complete search history.

(56) References Cited

U.S. PATENT DOCUMENTS

| | | | |
|---|---|---|---|
| 2,644,930 A | | 7/1953 | Luhrs et al. |
| 2,817,812 A | * | 12/1957 | Fox .................. H01P 1/393 |
| | | | 333/1.1 |
| 3,003,118 A | | 10/1961 | Kline |
| 8,552,809 B2 | | 10/2013 | Nealis et al. |

(Continued)

FOREIGN PATENT DOCUMENTS

| | | |
|---|---|---|
| EP | 2 600 465 | 1/2015 |
| JP | H03-181202 | 8/1991 |

OTHER PUBLICATIONS

Extended European Search Report for EP Application No. 20924987.9 dated Jun. 5, 2023, 10 pages.

(Continued)

*Primary Examiner* — Stephen E. Jones
(74) *Attorney, Agent, or Firm* — NIXON & VANDERHYE P.C.

(57) ABSTRACT

A hybrid circulator includes an isolator and an orthomode transducer coupled to the isolator. The hybrid circulator achieves high performance in the microwave and millimeter-wave (MMW) frequency range.

18 Claims, 4 Drawing Sheets

(56) References Cited

U.S. PATENT DOCUMENTS

| | | | |
|---|---|---|---|
| 2014/0295779 A1* | 10/2014 | Hasegawa | H04B 1/44 333/1.1 |
| 2016/0149283 A1 | 5/2016 | Shen et al. | |
| 2017/0192258 A1 | 7/2017 | Watanabe | |
| 2021/0050641 A1* | 2/2021 | Avakian | H01P 5/12 |

OTHER PUBLICATIONS

International Search Report and Written Opinion of the ISA for PCT/US2020/064485 dated Mar. 3, 2021, 13 pages.

International Preliminary Report on Patentability for PCT/US2020/064485 dated Nov. 10, 2021, 27 pages.

* cited by examiner

HYBRID CIRCULATOR

CROSS-REFERENCE TO RELATED APPLICATIONS

This application is the U.S. national phase of International Application No. PCT/US2020/064485 filed Dec. 11, 2020 which designated the U.S. and claims priority to U.S. Provisional Patent Application Ser. No. 62/992,376, filed on Mar. 20, 2020, the entire contents of each of which are hereby incorporated by reference.

TECHNICAL OVERVIEW

The technology described relates to waveguide circulator devices having ferrite circulator elements which can couple microwave energy to/from a pair of adjacent input/output ports while isolating a third input/output port.

INTRODUCTION

The conventional topology for microwave and millimeter-wave circulators is the Y-junction. In a Y-junction circulator, a ferrite core is situated at the convergence of three waveguides. The shape of the ferrite core is typically cylindrical or triangular, but other shapes can be used. The waveguides are typically coaxial, microstrip, or rectangular waveguides, but any type of waveguiding structure can be used.

Above 50 GHz, the bandwidth of conventional microwave and millimeter-wave circulators is severely constrained due to limitations in the ferrite material properties. What is needed is an all-new approach to the problem of directing signal flow in transmit and receive systems that operate in the microwave and millimeter-wave (MMW) frequency range and at desired, less-constrained bandwidths.

A SUMMARY

A hybrid circulator includes an isolator and an orthomode transducer coupled to the isolator. The hybrid circulator achieves high performance in the microwave and millimeter-wave (MMW) frequency range.

In example embodiments, the isolator includes one or more ports, and the orthomode transducer includes two or more ports. The isolation between the two or more ports is in a range of 30 dB to greater than 50 dB.

In example embodiments, the hybrid circulator includes a dual-moded waveguide that couples the isolator and the orthomode transducer. The dual-moded waveguide may be a square waveguide or a circular waveguide.

In example embodiments, the isolator is a Faraday rotation isolator that includes a waveguide coupled to a ferrite core, and wherein a transition from the waveguide to the ferrite core supports $TE_{10}$ and $TE_{01}$ modes. The Faraday rotation isolator may also include a first dielectric transition element coupled to first side of the ferrite core adjacent to the orthomode transducer and a second dielectric transition element coupled to a second side of the ferrite core. In one example implementation, the second dielectric transition element has a resistive layer and the first dielectric transition element does not have a resistive layer. In another example implementation, the first and second dielectric transition elements do not have a resistive layer. In one example implementation, the first and second dielectric transition elements are ceramic cones.

In example embodiments, the orthomode transducer (OMT) is configured to duplex two orthogonally polarized signals received from a first OMT port and a second OMT port. The OMT provides a high degree of isolation between the first and second OMT ports.

Example embodiments include a hybrid circulator configured to operate at frequencies above 25 GHz.

Example embodiments include a hybrid circulator having an operational frequency bandwidth in one or more of the following: about 26 GHz to 40 GHz; about 33 GHz to 50 GHz; about 40 GHz to 60 GHz; about 50 GHz to 75 GHz; about 60 GHz to 90 GHz; about 75 GHz to 110 GHz; about 90 GHz to 140 GHz; about 110 GHz to 170 GHz; about 140 GHz to 220 GHz; about 170 GHz to 260 GHz; about 220 GHz to 330 GHz; about 260 GHz to 400 GHz; about 330 GHz to 500 GHz; about 400 GHz to 600 GHz.

Example embodiments include a hybrid circulator having a fractional band in a range of about 30-35%.

Example embodiments include a system using the hybrid circulator.

Example embodiments include a method of making the hybrid circulator.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Conventional circulators are of the Y-junction type and are often used to direct signal flow in transmit and receive systems that operate in the microwave and millimeter-wave (MMW) frequency range, e.g., between 3 GHz (100 mm) and 300 GHz (1 mm). A Y-junction circulator has a ferrite core located at the junction of three waveguides. The magnetically-biased ferrite core is non-reciprocal which gives rise to the unique circulator behavior.

Figure 1:
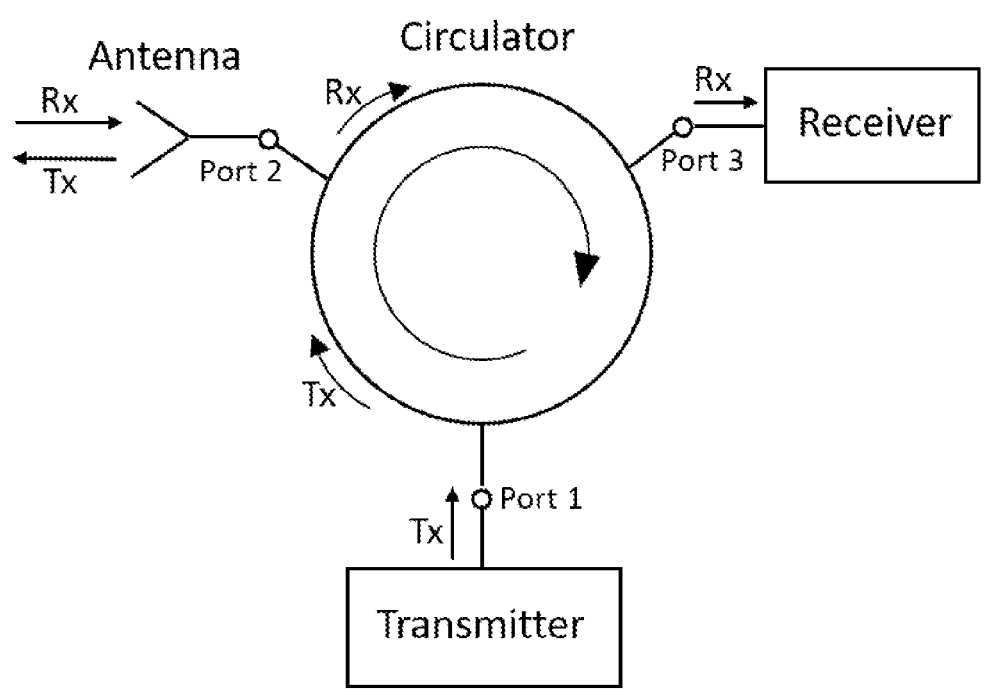
FIG. 1 shows an example circulator in a transmit-receive system.

FIG. 1 shows a circulator in a transmit/receive system that allows the transmitter and the receiver to use the same antenna. A signal from the transmitter (Tx) enters the circulator at port 1 and is directed to the antenna attached to port 2. The signal then propagates out from the antenna. Signals (Rx) entering the antenna are received at the circulator on port 2 and are directed through the circulator to the receiver located on port 3. Although a three port circulator is shown, a circulator with more than three ports may be used.

Most microwave and millimeter-wave components are "reciprocal," which means that signals passing through the component in one direction pass through the component the same way when travelling in the opposite direction. If a circulator was reciprocal (a circulator is nonreciprocal), then the received signal Rx entering the antenna would be directed right back to the transmitter rather than to the receiver. A circulator is somewhat analogous to a roundabout except that once a signal enters this roundabout it is forced to take the next available exit (port).

Two examples of transmit/receive systems are radar systems and communication systems that use two-way radio links. In these example systems, it is generally beneficial when the transmitter and receiver can share a common antenna as in FIG. 1. The circulator directs the transmit and receive signals to and from the shared antenna. In a radar system, the transmitter generates a powerful signal and sends it to the antenna for transmission. The transmitted signal spreads over a wide area and is reflected from target surfaces. Only a small fraction of the reflected signals make their way back to the antenna where they are directed to the receiver via the circulator. The Rx signal is therefore much weaker than the Tx signal in the radar example. Receivers need to be sensitive so that they can detect these small signals.

A higher performance circulator is characterized by broad bandwidth, high isolation, low insertion loss, and low port reflections. Referring to FIG. 1, low insertion loss means that the transmit (Tx) signal reaches the antenna port with little loss of power in the circulator. Low insertion loss also means that a signal entering the antenna port (Rx) reaches the receiver with very little loss of signal power in the circulator. An insertion loss of 0 dB means that no signal power was lost as the signal traversed through the circulator. This is the ideal situation, but in real systems there is always some loss. An insertion loss of 3 dB means that one half of the signal power was lost in the circulator. The lower the insertion loss, the better.

High isolation means that very little of the transmitter signal is coupled through the circulator directly to the receiver port and very little of the signal entering the antenna (Rx) gets coupled directly to the transmitter. Even a small amount of the transmitter signal (Tx) leaking directly to the receiver can overwhelm the small Rx signal. If the leakage is significant enough, then the transmitter signal can even damage the receiver, especially if it is sensitive. An isolation of 20 dB is generally a figure of merit for a circulator. An isolation of 20 dB means that less than 1% of the transmit signal (Tx) is directly coupled to the receiver by the circulator. However, in many applications, even higher isolation is desired or even required, especially when powerful transmitters are used in conjunction with sensitive receivers. It is also desirable that a small Rx signal does not get coupled directly from the antenna to the transmitter. Transmitters can be sensitive to small signals being coupled back into their output ports. Therefore, high isolation between the antenna and transmitter ports is also important.

Figure 2:
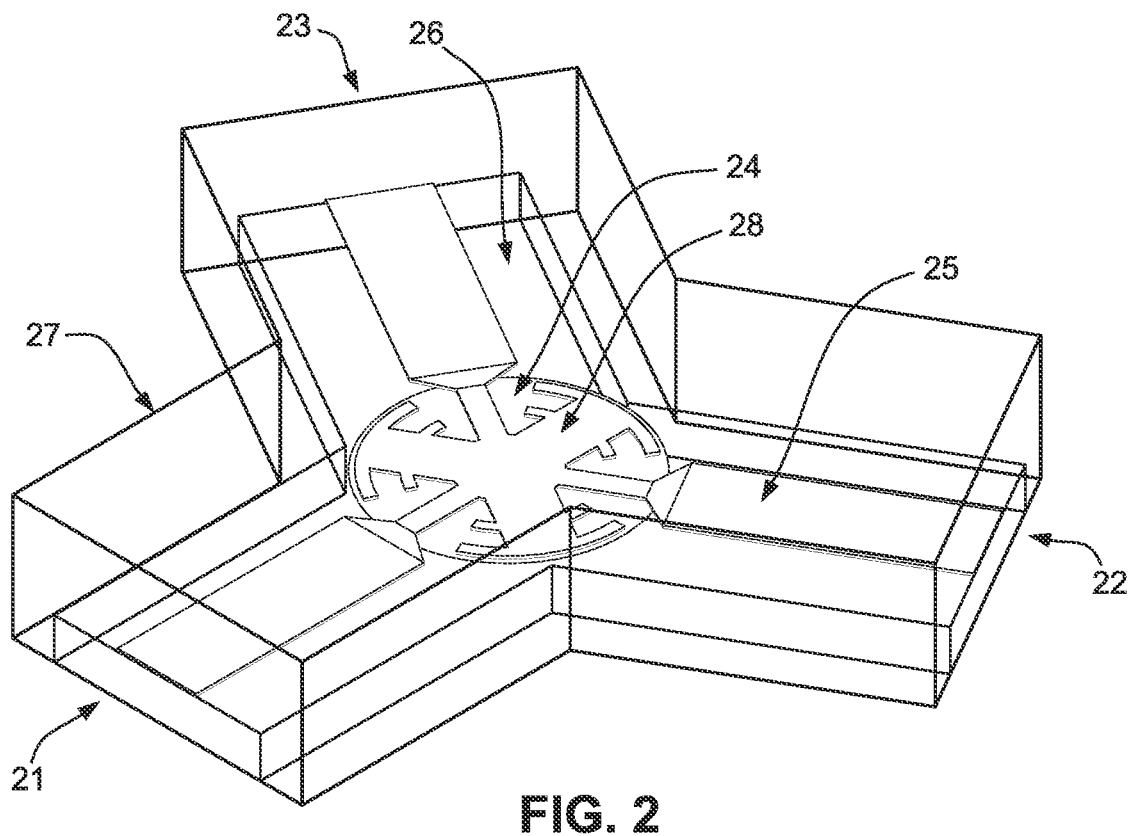
FIG. 2 shows an example Y-junction circulator in microstrip.

At frequencies from 1 GHz to 40 GHz, Y-junction circulators are often implemented with coaxial ports and microstrip waveguides. An example Y-junction circulator is shown in FIG. 2. The three circulator ports are indicated as 21, 22, and 23. In many implementations, a coaxial connector is attached to each of these microstrip ports 21, 22, and 23, but they are not shown in the figure for simplicity. In this example, the ferrite is in the shape of a disc 24 located just below a microstrip metal conductor 28, which is used to tune the circulator. The circulator may be housed inside a metallic housing 27.

Figure 3:
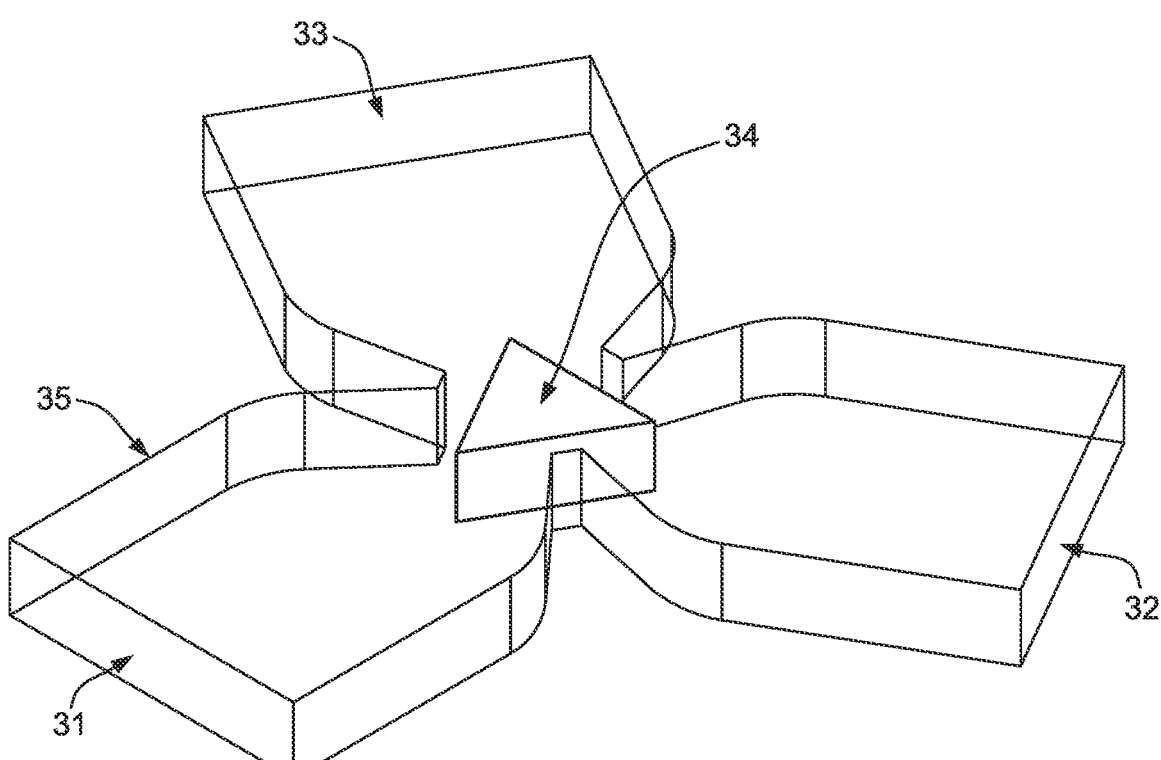
FIG. 3 shows an example Y-junction circulator rectangular waveguide.

Rectangular waveguides are often used at frequencies above 40 GHz due to their relatively low loss. Circulators using rectangular waveguides are also used at frequencies below 40 GHz in high-power applications. An example of circulator in waveguide is shown in FIG. 3. In this example, a triangular-shaped ferrite core 34 is situated at the convergence of three rectangular waveguides 35. Three rectangular waveguide ports are indicated as 31, 32, and 33.

Rectangular waveguides are limited to a finite range of frequencies where a single propagating mode exits. For rectangular waveguides, the primary mode is designated as $TE_{10}$, which means that the distribution of the electric and magnetic fields of signals propagating in the waveguide are constricted to a single pattern. If there were multiple modes in the waveguide, it would be difficult determine the distribution of the fields and to control their behavior.

The band of frequencies over which a rectangular waveguide is single moded is determined by the cross sectional dimensions of the waveguide. The smaller the dimensions, the higher the frequency band. For example, a V-band waveguide is rated for the frequency band from 50-75 GHz. In the V-band, there is only one propagating mode, the $TE_{10}$. Rectangular waveguide bands are typically rated at 40% of the center frequency. The center frequency for V-band is 62.5 GHz and the fractional bandwidth is (75 GHz-50 GHz)/(62.5 GHz)=40%. Most MMW systems use rectangular waveguides. It is advantageous to use waveguide components in these systems that give good performance over entire waveguide bands. The component with the narrowest bandwidth often sets the bandwidth limitation for the entire system.

Y-junction circulators with relatively good performance over full waveguide bands are available up to 40 GHz, although the isolation is generally less than 16 dB. Above 50 GHz, the bandwidth of Y-junction circulators is severely limited due to limitations in the ferrite material properties. Commercial circulators in V-band (WR-15, 50-75 GHz), E-band (WR-12, 60-90 GHz) and W-band (WR-10, 75-110 GHz) are advertised with nominal bandwidths of 2 GHz. At frequencies above 100 GHz, the rated bandwidth is typically 1 GHz. There are relatively few vendors who make circulators above 50 GHz, and their narrow bandwidth makes them unsuitable for many systems and applications.

What is needed is an all-new approach to achieve circulator function over broad bandwidths at microwave and millimeter-wave (MMW) frequencies. This need is met by a hybrid circulator comprising an orthomode transducer (OMT) and a modified Faraday rotation isolator that work together to form a broadband circulator with very high isolation between the transmitter and receiver ports. Because both the isolator and the OMT are broadband, the hybrid circulator can cover full-waveguide bands. Significantly, the bandwidth of the hybrid circulator does not decrease at higher millimeter-wave frequencies, and for example, can operate over the full WR-3.4 band (220-330 GHz). Circulators with the level of performance achieved by a hybrid circulator do not currently exist.

One example implementation of a MMW Faraday rotation isolator is now described, but it will be understood that any suitable MMW Faraday rotation isolator may be used in the hybrid circulator. The example MMW Faraday rotation isolator uses input and output ports that are single mode, $TE_{10}$, rectangular waveguides. Ceramic cones couple the signals between a cylindrical ferrite rod and the rectangular input and output waveguides. Within the ferrite rod, the signal propagates in a hybrid $HE_{11}$ mode. Both cones are bisected along a central axis by a resistive layer that is normal to the $TE_{10}$ polarization. The input and output rectangular waveguides are oriented 45° with respect to each other. Thus, the resistive layers in the two cones are also oriented 45° with respect to each other. Significantly, the resistive layers absorb reverse travelling signals that enter the output port of the isolator. Most of the reverse travelling signal may be absorbed in the resistive layer in the input side ceramic cone, but some may be absorbed in the output side cone as well.

An absorber material in the form of an annulus surrounds the ferrite rod but is kept at a small radius from the ferrite rod in order to avoid attenuation of the forward travelling signal. The absorber suppresses higher order modes in the region near the ferrite rod. Washer or disc shaped dielectric support structures at either end of the ferrite suspend the ferrite and cones in the center of the waveguides. All of the parts may be held together with low-loss epoxies.

A gyromagnetic element, which is typically made of a ferrite material, is referred to as a ferrite core below. The ferrite core is magnetically biased by rare earth magnets, e.g., neodymium or samarium cobalt. The magnetic bias field causes magnetic dipoles to align within the ferrite core which gives rise to Faraday rotation of signals as they pass through the ferrite material. A main primary function of the isolator in the hybrid circulator is to achieve 45° rotation of the signal polarity as it passes through the ferrite core.

The other element of the hybrid circulator is an orthomode transducer (OMT). An OMT is a duplexer for orthogonally polarized signals. Any suitable OMT may be used with a suitable Faraday rotation isolator in the hybrid circulator that achieves a circulator that provides high performance at millimeter-wave frequencies. An OMT may be made in a variety of ways. For example, an OMT may use a septum or it may not. An OMT may be realized as a set of waveguide features (steps) that effectively separate the vertical and horizontal polarizations in a square waveguide and direct them to separate single moded rectangular waveguides. A well-designed OMT will have high isolation between the two rectangular waveguide ports. OMT's can have isolation in excess of 60 dB between single moded rectangular ports.

The hybrid circulator advantageously combines OMT and isolator technologies to provide a broadband circulator that function with high performance at millimeter-wave frequencies.

Figure 4:
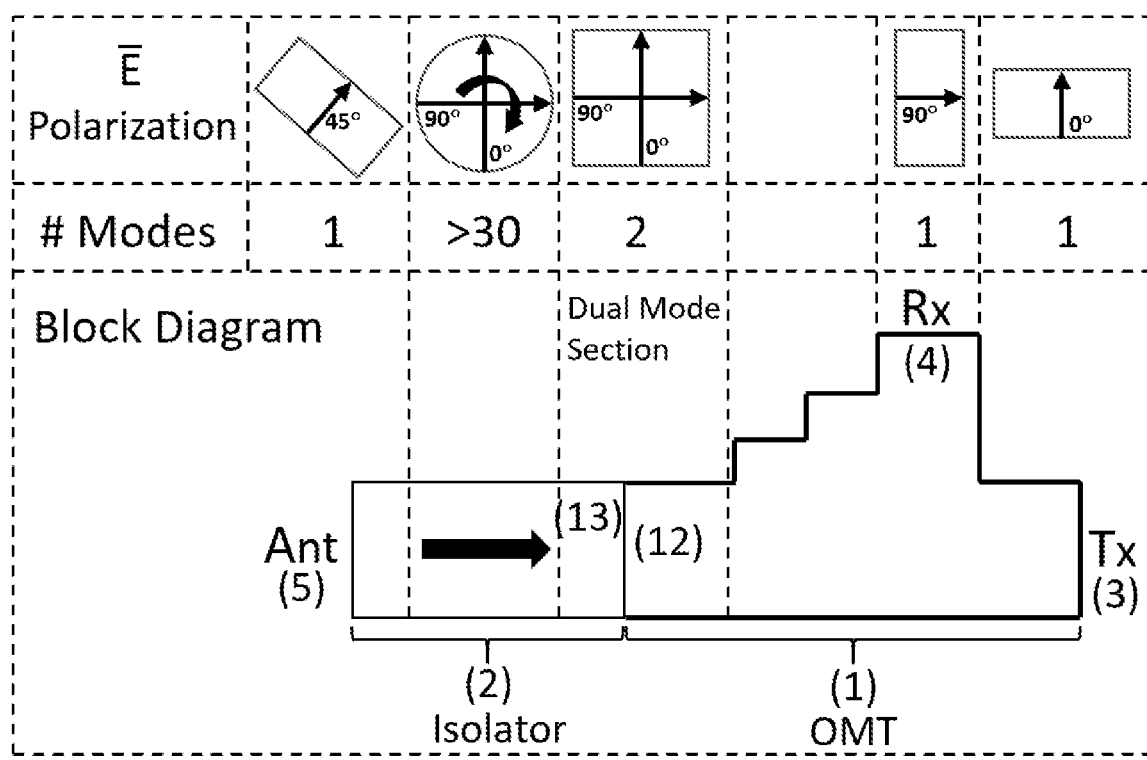
FIG. 4 shows a block diagram of an example hybrid circulator architecture in accordance with an example embodiment.
Figure 5:
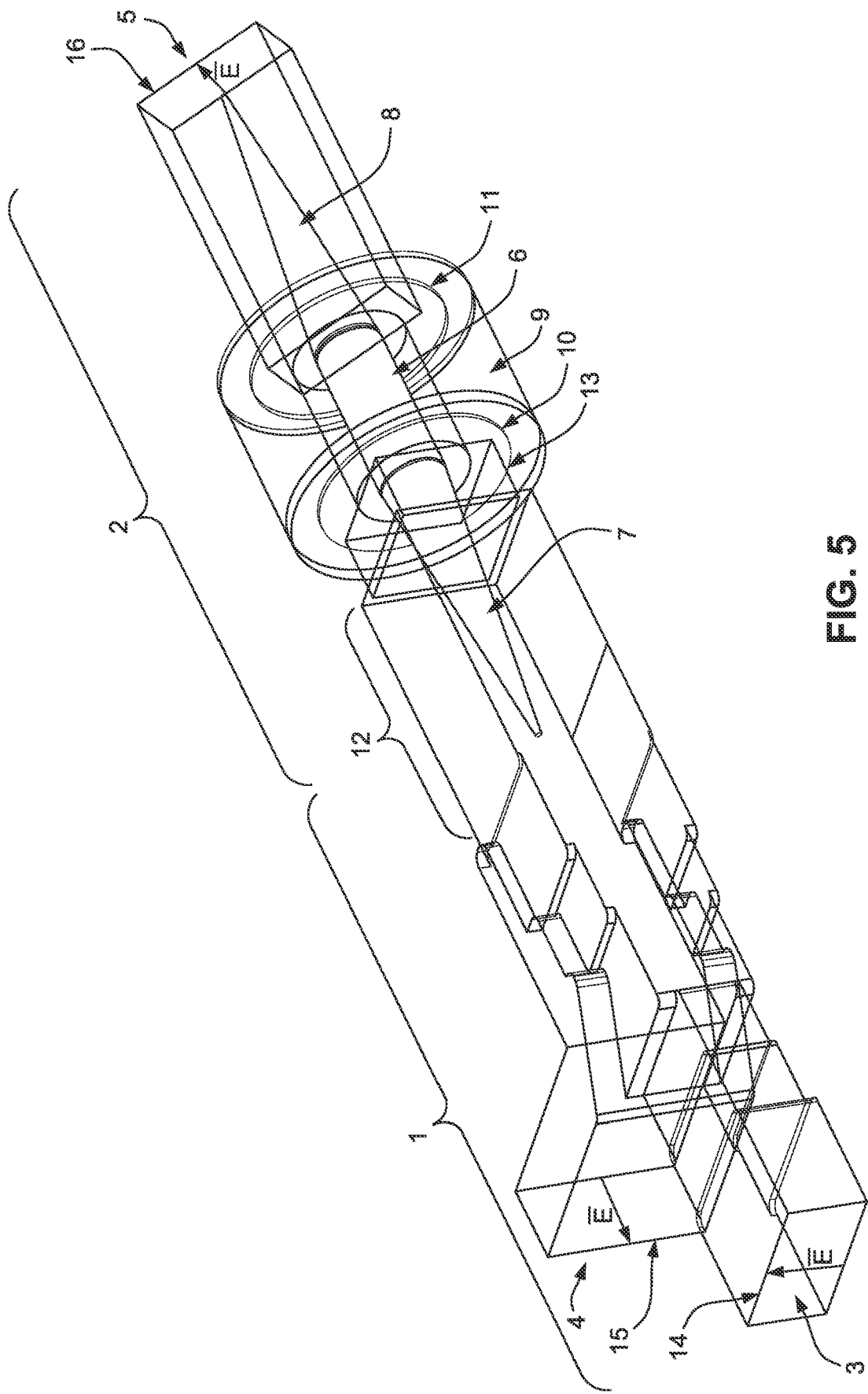
FIG. 5 shows a perspective view of an example hybrid circulator in accordance with an example embodiment.

A block diagram of an example hybrid circulator architecture in accordance with an example embodiment is shown in FIG. 4. FIG. 5 shows a perspective view of an example hybrid circulator in accordance with an example embodiment which is described in conjunction with the block diagram of FIG. 4.

The hybrid circulator comprises a modified Faraday rotation isolator 2 and an orthomode transducer (OMT) 1. The isolator 2 is modified from a conventional Faraday rotation isolator in several respects. First, the single-mode output side rectangular waveguide of the isolator 2 is replaced with a dual-moded waveguide 13, e.g., a square or circular waveguide. For a square waveguide, the two modes are the degenerate $TE_{10}$ and $TE_{01}$ modes. Second, the transition (the dual-moded waveguide 13) from the ferrite 6 to the square waveguide 12 must support both the $TE_{10}$ and $TE_{01}$ modes. Third, in order that the transmit (Tx) signal is not absorbed in the output cone, the output side ceramic cone 7 does not have a resistive layer. The output side (see 7 and 13 in FIG. 5) of the modified isolator is attached to the dual-mode waveguide 12 of the OMT 1.

The block diagram shown in FIG. 4 tracks signal polarization as signals propagate through the hybrid circulator. In FIG. 4, E polarization refers to the direction in which the electric field (a vector having magnitude and direction) is pointing. The transmit (Tx, 3) and receive (Rx, 4) ports (labeled in both FIGS. 4 and 5) are the single mode rectangular waveguide ports on the OMT 1, and the antenna (Ant) port 5 is a port of the isolator 2. The isolator 2 rotates the polarization of the transmit signal so that it couples to the Ant port 5 at a polarization of 45°. The isolator 2 rotates the polarization of the receive signal so that it couples to the Rx port 4 at a 90° polarization. High isolation between the Tx 3 and Rx 4 ports is achieved due to the orthogonal polarization of the two signals in the OMT 1 as described earlier.

According to an example embodiment, an example hybrid circulator in FIG. 5 shows that the modified isolator 2 includes a solid ceramic cone 7 (other types and shapes of dielectric elements may be used) with no resistive layer on the OMT 1 side. The locations of the transmitter port Tx 3, receiver port Rx 4, and antenna port Ant 5 are shown. Although the dual-mode section 12 is shown as square, in alternate embodiments, it may have other cross sections, such as for example, circular.

The ferrite core 6 is connected on a side facing the OMT1 to the ceramic cone 7 with no resistive layer (reference 13 identifies a stepped or tapered transition) and on the other side to a ceramic cone 8 (other types and shapes of dielectric elements may be used) with a resistive layer that is aligned normal (perpendicular) to the transverse electric $TE_{10}$ mode in the Ant port rectangular waveguide port 4. There is a support 10 for the ferrite core 6 and the ceramic cone with no resistive layer 7 as well as a support 11 for the ferrite core 6 and the ceramic cone with resistive layer 8. A microwave absorber 9 encases the ferrite core 6 and the supports 11 and 12.

The polarizations of the propagating modes in each section of the hybrid circulator are shown as E vectors in FIG. 4 and FIG. 5. All three ports on the hybrid circulator (Tx 3, Rx 4, and Ant 5) are single mode $TE_{10}$ in rectangular waveguide. Polarization is rotated by 45° as signals pass through the isolator 2. The direction of rotation is the same regardless of the direction of signal propagation (right-toleft or left-to-right). This is the essential nonreciprocal property of the magnetically-biased ferrite core 6. For the purpose of illustration, the signal is shown rotating in the clockwise direction in FIG. 4.

An operation of the hybrid circulator is now described by describing signals from the three ports 3, 4, and 5 of the hybrid circulator as they pass through the device. First, consider a signal entering the Tx port 3 and traveling from right-to-left in the diagram in FIG. 4. The signal travels from the Tx port 3 to the dual-mode section of the OMT 12 without any change in polarization and thus remains at 0°. As the signal from the Tx port 3 passes through the isolator 2, the polarization is rotated 45° in the clockwise direction. The polarization rotated signal from the Tx port 3 is then coupled to the $TE_{10}$ mode in the antenna port waveguide (5) having a polarization shown as 45° in FIGS. 4 and 5.

Now consider a signal entering the antenna port (5) having a polarization of 45° and travelling from left-to-right in the diagram in FIG. 4. As the antenna signal passes through the isolator 2, the polarization is rotated an additional 45° in the clockwise direction and enters the dual-mode section 12 with a polarization of 90°. That signal passes through the OMT 1 and is coupled to the Rx port 4.

Consider a signal entering the Rx port 4. The signal is coupled to the dual mode section of the OMT 1) with a polarization of 90°. As the signal passes through the isolator 2, the polarization is rotated an additional 45° in the clockwise direction. The polarization is now orthogonal to the $TE_{10}$ mode in the antenna port (5) and therefore cannot couple to the antenna waveguide. The signal does not reflect but rather is absorbed in a resistive layer located in the ceramic cone 8 on the input side (antenna side) of the isolator. There is inherent high isolation between the Rx and Tx ports due to orthogonal polarizations. As explained earlier, the function of an orthomode transducer (OMT) is to duplex two orthogonally polarized signals. The OMT 1 has a high degree of isolation between the two single mode ports Tx and Rx.

In another example embodiment, a waveguide twist may be applied on the antenna side to the hybrid circulator shown in FIG. 5 to realign the antenna waveguide to the transmit waveguide or the receive waveguide. The cross section of the dual mode waveguide 12 can be either square or circular.

In an example embodiment, the hybrid circulator may be a metallic, gold-plated aluminum rectangle with three of the sides having rectangular waveguide flanges, one for each of the Tx 3, Rx 4, and Ant 5 ports. The hybrid circulator, in one example implementation, may have dimensions approximately to 0.75"×0.75"×1". The 1" dimension defines in this example the distance between the Tx 3 and Ant 5 ports. These dimensions are examples only and will vary depending on the frequency of the implementation, the type of Faraday rotator used, the type of OMT used, the type of transition used between the OMT and isolator, the length of the dual mode section that is used, and/or whether waveguide twists are added to any of the three ports to realign them.

The sizes of the constituent components in the hybrid circulator vary with frequency, becoming smaller at higher frequencies. The following non-limiting, example ranges of dimensions cover an example frequency range from 25 GHz to 500 GHz.

The dielectric cone (7, 8) base diameter may range from 0.15 inches to 0.008 inches. The cone tip diameter may be made as small as possible to minimize signal reflections. An example range for cone tip diameters is 0.01 inches to 0.001 inches. An example angle of the cones is 11°. The cone lengths may be determined based on the cone base diameter, the cone tip diameter, and the full angle.

The ferrite core 6 diameter may range from 0.15 inches to 0.008 inches, and in one example embodiment, is similar to the corresponding cone base diameter. Ferrite core 6 length depends on the ferrite material properties. There are many suitable ferrite materials available on the commercial market, with some giving better performance at the higher MMW frequencies. Ferrite length may also be a function of the magnetic bias field strength. Given these variables, an example range of ferrite lengths may be 0.05 inches to 0.16 inches. Typically, the ferrite length is not a strong function of frequency but rather more strongly determined by the ferrite material properties and the magnetic bias field strength.

An example range of the outer diameter of the absorber annulus 9 may be 0.3 inches to 0.016 inches. The inner diameter of the absorber annulus may be in the example range from 0.2 inches to 0.012 inches. The length of the absorber annulus may be in the example range from 0.05 inches to 0.16 inches and may be similar to the length of the ferrite core 6.

The washer or disc shaped supports 10 & 11 may have a thickness in the example range from 0.02 inch to less than 0.001 inch. The thickness depends on the frequency and also on the material used (e.g., mica, CVD diamond, BOPET, styrene, quartz, etc). The inner diameter of the washer shaped support may be marginally larger than the diameters of the cone base and the ferrite core. The outer diameter of the support may be large enough to allow sufficient overlap to the surface of the absorber annulus. In some examples, the support diameter may be made larger than the diameter of the absorber annulus so that the support extends to the metal housing. This may be useful in an embodiment that uses a solid, disc-shaped piece of CVD diamond so that the diamond can channel heat from the resistive layer in the cone to the metal housing.

The dimensions of the broadwall (14, 15, 16) and short wall of the waveguide may be determined by the waveguide band. Examples are as follows: in the Ka-band (WR-28, 26-40 GHz), the broadwall may have a length of 0.28 inches and the short wall may be half that amount at 0.14 inches. In the WR-2.2 band (330-500 GHz), the broadwall length may be 0.022 inches and the short wall length may be 0.011 inches.

The dimensions of the dual mode waveguide 12 may be the same or somewhat smaller than the broadwall lengths. An overall length of the hybrid circulator from the transmit flange to the antenna flange may be in the example range between 0.8 inches and 3 inches. However, this dimension may be influenced by waveguide twist sections that may be used to realign waveguide flanges as described in subsequent embodiments.

Another example embodiment adds a waveguide twist to one or more of the ports Tx 3, Rx 4, and/or Ant 5 to realign the waveguides. FIG. 4 and FIG. 5 show the broadwall 14 of the transmit waveguide 3 oriented horizontally, the broadwall 16 of the antenna waveguide 5 oriented at 45° and the broadwall 15 of the receiver waveguide 4 oriented vertically.

Another example embodiment, adds a 45° twist to the antenna waveguide to realign the antenna waveguide with either the receiver waveguide 4 or the transmitter waveguide 5. It may be desirable to add twists to two of the ports so that all three waveguides are aligned in the same orientation, for example, to make it easier to attach the hybrid circulator to other components in a system.

Another example embodiment replaces the square waveguide in the dual-mode section of FIG. 5 with a circular waveguide.

Another example embodiment replaces the OMT transducer 1 shown in FIG. 5 with any other OMT structure including those with or without septums.

Another example embodiment replaces the ceramic cones 7 and 8 shown in the hybrid circulator in FIG. 5 with cones made from another dielectric material. Silicon is one example.

Another example embodiment the support structures 10 and 11 shown in the hybrid circulator in FIG. 5 may be rings and/or washers made from another dielectric material such as BOPET, styrene, or CVD diamond.

Another example embodiment varies the waveguide transitions between the dual-mode section 12 and the ferrite core 6 shown in the hybrid circulator in FIG. 5. The waveguide transitions can be stepped, tapered, elliptical, or any transition that effectively couples both modes in the dual-mode section to the ferrite.

Another example embodiment replaces the modified isolator 2 shown in the hybrid circulator in FIG. 5 with another ferrite-based Faraday rotator element. In the hybrid circulator, a main function of the modified isolator is to rotate the polarization of the signal by 45 degrees. The direction of rotation must be in just one direction (clockwise or counterclockwise), regardless of the direction of signal propagation. The required rotation is thus nonreciprocal. The hybrid circulator may use any Faraday rotator in conjunction with any OMT to provide circulator function.

Another example embodiment replaces the ceramic cones in the hybrid circulator in FIG. 5 with a differently shaped dielectric to transition between waveguides and the ferrite core. For instance, a stepped cone (a stack of increasingly larger cylinders) may be used in place of a smooth cone. Stepped features may provide desired broadband performance with shorter dimensions. Another example is cones with an elliptical profile.

Another example embodiment attaches a high power attenuation to the Rx port in the hybrid circulator in FIG. 5 to create a relatively high-power isolator for MMW frequencies. Faraday rotation isolators, even those with diamond heat spreaders, are limited in reverse power handling due to the very small size of the resistive layers in the small ceramic cones. Terminating one of the ports of a circulator with a matched load (a resistive termination) creates an isolator. That permits the attached termination to be constructed in ways to handle significant amounts of power. Adding diamond heat sinks increases the power handling of the Faraday rotation isolator in the hybrid circulator.

Another example embodiment includes the example embodiment just described and also removes the resistive layer from input side cone 8 so that both cones 7 and 8 are solid and have no resistive layer. This may further enhance power handling by removing a heat source from the isolator section.

In the above description, only three ports have been shown and discussed. It should be appreciated that the recessed ferrite element configurations shown and described could also be applied to T-junction circulators, four-port circulators, or circulators having any number of ports.

Many realizations of the OMT are possible as described in technical literature that describes OMTs. Many realizations of the OMT are possible as described in technical literature that describes isolators.

Example embodiments include a method of making the hybrid circulator. The hybrid circulator can be manufactured via molding, casting, or machining, among other possible manufacturing techniques.

Example embodiments include one or more systems using the hybrid circulator. Many microwave and millimeter-wave systems operate over broad bandwidths. Conventional circulator technology (e.g., Y-junction) is narrow band with fractional bandwidths near 1 GHz at frequencies above 100 GHz. The hybrid circulator does not have the same form of the standard Y-junction. It is instead a hybrid of two distinct technologies: a modified Faraday rotation isolator and an orthomode transducer (OMT), both of which are broadband. While Y-junction circulators can be made to operate over a full-waveguide band at lower frequencies (below 40 GHz), it comes at the cost of degraded performance in terms of lower isolation. At frequencies above 50 GHz, the bandwidth of Y-junction circulators is very narrow (2 GHz) which places undesirable bandwidth limitations on transmit/receive systems. The hybrid circulator fractional bandwidth is in a range of about 30-35%, and may under certain circumstances approach 40%, covering a full rectangular waveguide band. As an example, a Y-junction isolator working at 160 GHz will have a typical bandwidth near 1 GHz. In contrast, a hybrid circulator can cover the entire WR-6.5 waveguide band from 110 GHz to 170 GHz, a bandwidth of 60 GHz.

Example embodiments include a hybrid circulator configured to operate at frequencies above 25 GHz.

Example embodiments include a hybrid circulator having an operational frequency bandwidth in one or more of the following: about 26 GHz to 40 GHz; about 33 GHz to 50 GHz; about 40 GHz to 60 GHz; about 50 GHz to 75 GHz; about 60 GHz to 90 GHz; about 75 GHz to 110 GHz; about 90 GHz to 140 GHz; about 110 GHz to 170 GHz; about 140 GHz to 220 GHz; about 170 GHz to 260 GHz; about 220 GHz to 330 GHz; about 260 GHz to 400 GHz; about 330 GHz to 500 GHz; about 400 GHz to 600 GHz.

The isolation between the transmit Tx port 3 and the receive Rx port 4 is also much higher for the hybrid circulator than for conventional Y-junction circulators. The isolation between the Tx and Rx ports in a Y-junction isolator is typically in the range 12-25 dB. The Tx/Rx isolation of the hybrid circulator can be in a range of 30 dB to greater than 50 dB due to the orthogonal polarizations in the orthomode transducer (OMT). This is significant because the transmit signal in many application is very large and the receiver sensitivity is very high. So even a small amount of leakage through the circulator from the Tx to the Rx can cause problems for the receiver. The wide bandwidth and high isolation makes the hybrid circulator very useful for many applications that need greater bandwidth and/or isolation.

Broadband, hybrid MMW circulators will have immediate use in a wide range of transmit and receive systems including radar and point-to-point radio. One example application solves backhaul problems for 5G and 6G wireless communication systems where millimeter-wave point-to-point radios transmit broadband signals between cell towers and fiber optic link(s). Broadband, hybrid MMW circulators will have immediate use in a wide range of NASA instruments including G-Band (160 GHz) radar for measuring microphysical properties of clouds and upper atmospheric constituents (particles of less than mm size). Another example is airborne science systems such as NASA Cloud Radar System (CRS) high altitude aircraft and APR-3 precipitation radar and NASA applications in the band 150-190

GHz. Example other applications include airport radar, battlefield radar, compact range radar, imaging systems, chemical and bio-agent detection, and aeronautic vision enhancement systems.

Ultimately, the hybrid circulator improves the performance of many transmit/receive systems by providing significantly more bandwidth at MMW frequencies.

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments.

Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional. In the present application, the words "configured to . . . " are used to mean that an element of an apparatus has a configuration able to carry out the defined operation. In this context, a "configuration" means an arrangement or manner of interconnection. "Configured to" does not imply that the apparatus element needs to be changed in any way in order to provide the defined operation. The terms "wherein," "such that," etc. indicate structure, requirements of a method, and/or other features to be given patentable weight.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller subranges are also included. The upper and lower limits of these smaller ranges are also included therein, subject to any specifically excluded limit in the stated range.

The term "about" or "approximately" means an acceptable error for a particular recited value, which depends in part on how the value is measured or determined. In certain embodiments, "about" can mean 1 or more standard deviations. When the antecedent term "about" is applied to a recited range or value it denotes an approximation within the deviation in the range or value known or expected in the art from the measurements method. For removal of doubt, it shall be understood that any range stated herein that does not specifically recite the term "about" before the range or before any value within the stated range inherently includes such term to encompass the approximation within the deviation noted above.

It is the express intention of the applicant not to invoke means-plus-function, step-plus-function, or other functional claiming treatment for any claim except for those in which the words "means for" or "step for" explicitly appear together with an associated function in such claim.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A hybrid circulator comprising:
   at least three hybrid circulator ports;
   a Faraday rotator including a cylindrical ferrite rod surrounded by a radio frequency (RF) absorbing material and coupled to a dual-moded waveguide by a first dielectric transition element attached to one end of the cylindrical ferrite rod and coupled to a single mode rectangular waveguide by a second dielectric transition element attached to the other end of the cylindrical ferrite rod; and
   an orthomode transducer coupled to the Faraday rotator, wherein the Faraday rotator and the orthomode transducer are coupled by the dual-moded waveguide, and
   wherein the hybrid circulator is non-reciprocal and directs a microwave signal or a radio frequency signal entering one of the at least three hybrid circulator ports to exit through another of the three hybrid circulator ports directly after the one hybrid circulator port it entered.

2. The hybrid circulator in claim 1, wherein the Faraday rotator includes one of the hybrid circulator ports, and the orthomode transducer includes two or more of the hybrid circulator ports.

3. The hybrid circulator in claim 2, wherein isolation between the two or more hybrid circulator ports is greater than 20 dB.

4. The hybrid circulator in claim 1, wherein the cylindrical ferrite rod is suspended between the dual-moded waveguide and the single mode rectangular waveguide.

5. The hybrid circulator in claim 1, wherein the dual-moded waveguide is a square waveguide or a circular waveguide.

6. The hybrid circulator in claim 1, wherein the cylindrical ferrite rod supports an $HE_{11}$ mode.

7. The hybrid circulator in claim 6, wherein a transition from the dual-moded waveguide to the cylindrical ferrite rod supports TE10 and TE01 modes.

8. The hybrid circulator in claim 1, wherein the first dielectric transition element has no resistive layer and the second dielectric transition element has a resistive layer.

9. The hybrid circulator in claim 8, wherein the resistive layer of the second dielectric transition element bisects a central axis of the second dielectric transition element.

10. The hybrid circulator in claim 1, wherein the first and second dielectric transition elements do not have a resistive layer.

11. The hybrid circulator in claim 1, wherein the orthomode transducer (OMT) is configured to duplex two orthogonally polarized signals from a first of the hybrid circulator ports and a second of the hybrid circulator ports.

12. The hybrid circulator in claim 11, wherein the OMT provides a high degree of isolation between the first and second hybrid circulator ports.

13. The hybrid circulator in claim 1 configured to operate at frequencies above 25 GHz.

14. The hybrid circulator in claim 1 having an operational frequency bandwidth in one or more of the following: about 26 GHz to 40 GHz; about 33 GHz to 50 GHz; about 40 GHz to 60 GHz; about 50 GHz to 75 GHz; about 60 GHz to 90 GHz; about 75 GHz to 110 GHz; about 90 GHz to 140 GHz; about 110 GHz to 170 GHz; about 140 GHz to 220 GHz; about 170 GHz to 260 GHz; about 220 GHz to 330 GHz; about 260 GHz to 400 GHz; about 330 GHz to 500 GHz; about 400 GHz to 600 GHz.

15. The hybrid circulator in claim 1 having a fractional band greater than 20%.

16. A system using the hybrid circulator of claim 1.

17. A method of making the hybrid circulator of claim 1.

18. The hybrid circulator in claim 1, wherein the first and second dielectric transition elements are ceramic cones.

\* \* \* \* \*